US012202668B2

(12) United States Patent
Stambro et al.

(10) Patent No.: US 12,202,668 B2
(45) Date of Patent: Jan. 21, 2025

(54) REFUSE COMPRESSION APPARATUS AND A METHOD FOR OPERATING REFUSE COMPRESSION APPARATUS

(71) Applicant: Ab Närpes Trä & Metall—Oy Närpiön Puu ja Metalli, Närpes (FI)

(72) Inventors: Peter Stambro, Närpes (FI); Kristian Hummelgård, Närpes (FI)

(73) Assignee: AB NÄRPES TRÄ & METALL—OY NÄRPION PUU JA METALLI, Närpes (FI)

( * ) Notice: Subject to any disclaimer, the term of this patent is extended or adjusted under 35 U.S.C. 154(b) by 6 days.

(21) Appl. No.: 17/751,292

(22) Filed: May 23, 2022

(65) Prior Publication Data

US 2023/0373714 A1 Nov. 23, 2023

(51) Int. Cl.
*B30B 9/30* (2006.01)
*B30B 1/32* (2006.01)
(Continued)

(52) U.S. Cl.
CPC .............. *B65F 1/1405* (2013.01); *B30B 1/32* (2013.01); *B30B 9/3021* (2013.01); *B65F 3/208* (2013.01)

(58) Field of Classification Search
CPC ... B30B 9/3021; B30B 9/3042; B30B 9/3046; B30B 9/301; B30B 1/32; B30B 9/3082;
(Continued)

(56) References Cited

U.S. PATENT DOCUMENTS 4,833,971 A 5/1989 Kubik
6,240,758 B1 * 6/2001 Nagakura .............. B30B 1/323 72/21.4
(Continued)

FOREIGN PATENT DOCUMENTS

EP 3 109 485 12/2016
EP 3 620 296 3/2020
(Continued)

OTHER PUBLICATIONS

Oct. 17, 2023 Search Report issued in European Patent Application No. 23173860.0, pp. 1-7.
(Continued)

*Primary Examiner* — Jimmy T Nguyen
(74) *Attorney, Agent, or Firm* — Nixon & Vanderhye PC

(57) ABSTRACT

A compression apparatus for compressing refuse into a collection bin is provided. The compression apparatus includes: a compression tool having a first end and a second end, where the first end of the compression tool is pivotably hinged in the compression apparatus, and rotation of the second end of the compression tool is actuated by a hydraulic cylinder. Further, the hydraulic cylinder includes three separate chambers such that a first extracting chamber and a second extracting chamber are arranged on an extracting side of the hydraulic cylinder, and a retracting chamber is arranged on a retracting side of the hydraulic cylinder, and the first extracting chamber and the second extracting chamber are configured to be utilized separately or jointly. A method for operating a compression apparatus for a refuse collection bin also is provided.

10 Claims, 9 Drawing Sheets

(51) Int. Cl.
*B65F 1/14* (2006.01)
*B65F 3/20* (2006.01)

(58) Field of Classification Search
CPC ..... B30B 9/3057; B30B 15/161; B30B 1/323; B65F 1/1405; B65F 3/208; F15B 11/036
USPC .......................................................... 100/233
See application file for complete search history.

(56) References Cited

U.S. PATENT DOCUMENTS

| | | | |
|---|---|---|---|
| 7,370,569 B2 | 5/2008 | Schmidt et al. | |
| 10,421,246 B2 * | 9/2019 | Kurz | B30B 15/165 |
| 2003/0084794 A1 * | 5/2003 | Koyama | F15B 11/022 100/269.01 |
| 2013/0312599 A1 | 11/2013 | Cover | |

FOREIGN PATENT DOCUMENTS

| | | | |
|---|---|---|---|
| FI | 128828 | 1/2021 | |
| FR | 2 572 018 | 10/1984 | |
| WO | WO-2008148387 A1 * | 12/2008 | B30B 9/3007 |

OTHER PUBLICATIONS

Search Report issued on Nov. 14, 2022 in corresponding Finnish Application No. 20225517, 1 page.

* cited by examiner

REFUSE COMPRESSION APPARATUS AND A METHOD FOR OPERATING REFUSE COMPRESSION APPARATUS

BACKGROUND OF THE INVENTION

Field of the Invention

This invention relates to a refuse compression apparatus and a method for operating a refuse compression apparatus.

Such a refuse compression apparatus is employed when collected refuse is compressed into a refuse collection bin to fit as much of refuse into the refuse collection bin as possible.

Description of Prior Art

When refuse is collected it must be compressed into a refuse collection bin to maximally utilize the volume of the refuse collection bin. Therefore, compression apparatuses having compression tools actuated by hydraulic cylinders for instance are used to perform this refuse compression. Such compression apparatuses may be used in refuse collection sites or in mobile refuse collection vehicles, for instance.

The compression force required during the use of the compression apparatus varies greatly, as in the first portion of the compressing cycle, there is either no load or low load until the compression tool reaches contact with the refuse to be compressed. The second portion of the compression requires a higher force generated by the hydraulic cylinder, as the load exerted by the compressed refuse increases as it is being compressed tighter. The retraction portion of the compression cycle in turn requires a lower force as there is no refuse restricting the retracting movement.

In previously known solutions, the hydraulic cylinder actuating the compression tool is a dual-operation two-chamber hydraulic cylinder which produces a fixed maximum amount of force in both directions. Such hydraulic cylinders must be scaled to match the highest load of the compression cycle in order to be able to complete the compressing operation. Due to this, the hydraulic cylinder is oversized for at least part of the compression cycle, thus making it inefficient during significant period of its operation. Particularly, unnecessarily high amount of hydraulic fluid is used during the lower load portions of the compression cycle, making it inefficient in view of hydraulic fluid usage. The two-chamber cylinders also require unnecessary high flows for retracting at low loads.

Using such a two-chamber hydraulic cylinder is also inefficient in view of cycle time, as in order to move through the unloaded phase faster, the flow rate of the pump would need to be raised temporarily. This is not optimal as it raises the temperature of the system and also increases the demands set for the pump, thus raising costs.

Particularly, refuse collection vehicles having a refuse compression apparatus often comprise also other hydraulic cylinders for actuating other tasks during refuse collection. While operating the compression function simultaneously with other functions, the highest pressure will prevail, which causes significant losses as the compression function requires high flows, but only low pressures. As a result of functions operating at different pressure levels, heat is generated, which in turn requires cooling.

The oversized cylinders require higher pump flows, which requires larger pumps, and/or higher pump shaft speeds in order to make multi-function possible, or flow prioritization must take place.

Respectively, the known methods for operating a refuse compression apparatus are limited in aspects detailed above.

SUMMARY OF THE INVENTION

An object of the present invention is to solve the above mentioned problems and to provide a compression apparatus which is more efficient and better adjusted for the common load profile of compressing refuse, and to provide an improved method for operating a compression apparatus. These and other objects are achieved with a compression apparatus and with a method for operating a refuse compression apparatus, as disclosed herein.

When the refuse compression apparatus comprises a hydraulic cylinder according to an example embodiment, the compression apparatus is better suited to fit the load profile of the refuse compression cycle, which results in improved efficiency and cost savings.

Preferred embodiments of the invention also are disclosed herein.

Further advantages and details of the invention are disclosed in detail in the description below.

BRIEF DESCRIPTION OF DRAWINGS

In the following the present invention will be described in closer detail by way of example and with reference to the attached drawings, in which.

DESCRIPTION OF AT LEAST ONE EMBODIMENT

In the following description, the terms 'first', 'second', 'extracting', 'retracting', and so on, are used only to separate similar features or refer to directions relative to the hydraulic cylinder 3 of the compression apparatus 1 or its constructional details as they are shown in the attached figures.

Figure 1:
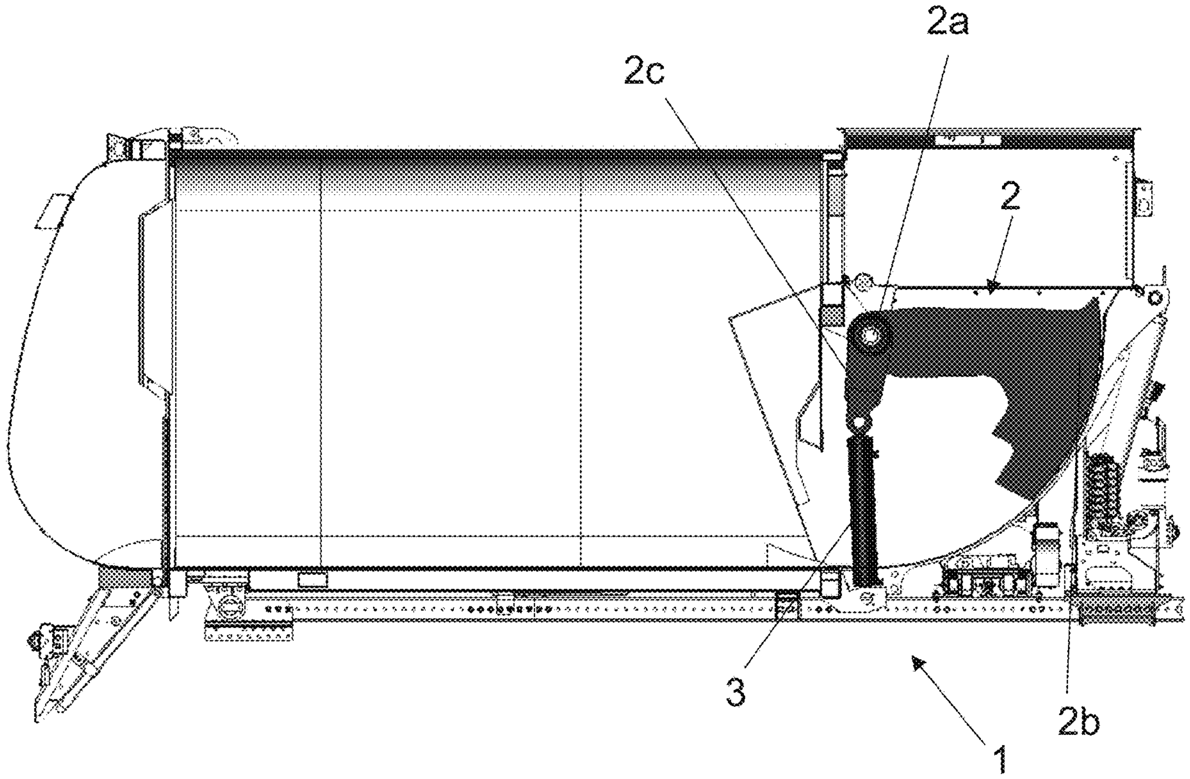
FIGS. 1 to 3 illustrate a side view of an embodiment of the invention at different stages during its operation, wherein the compression apparatus is highlighted and made visible through structures.
Figure 2:
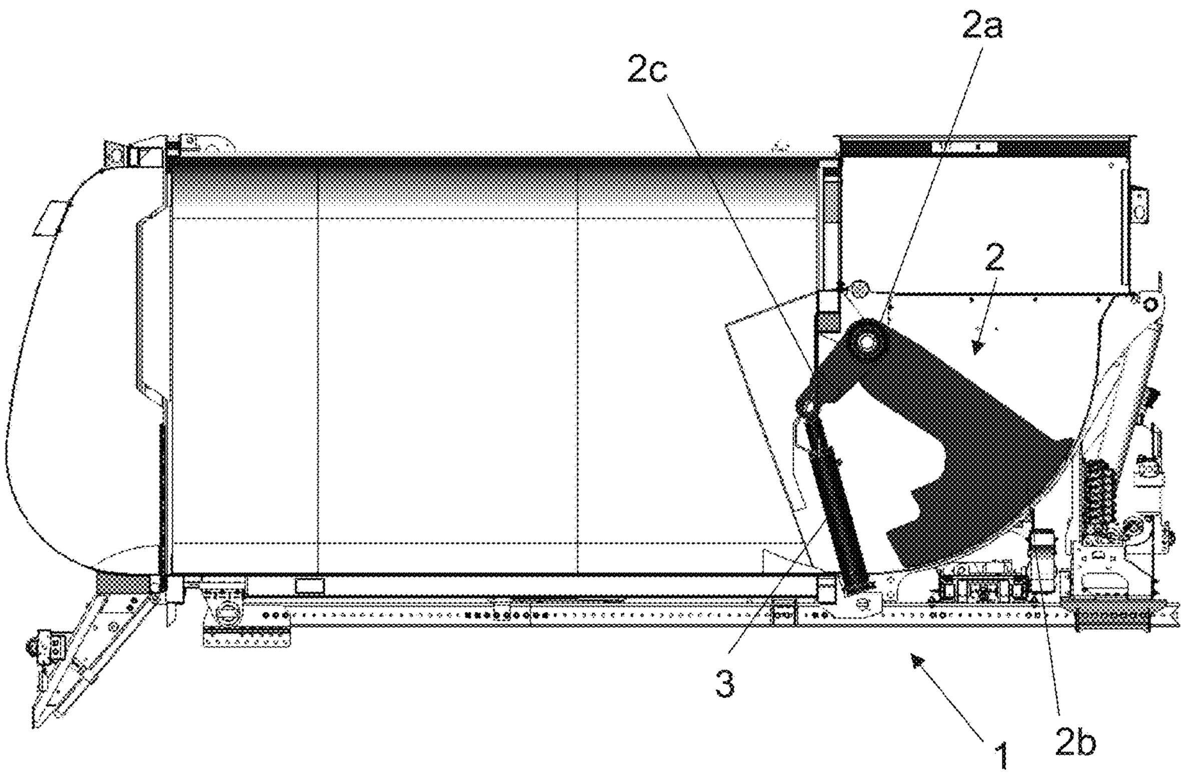
Figure 3:
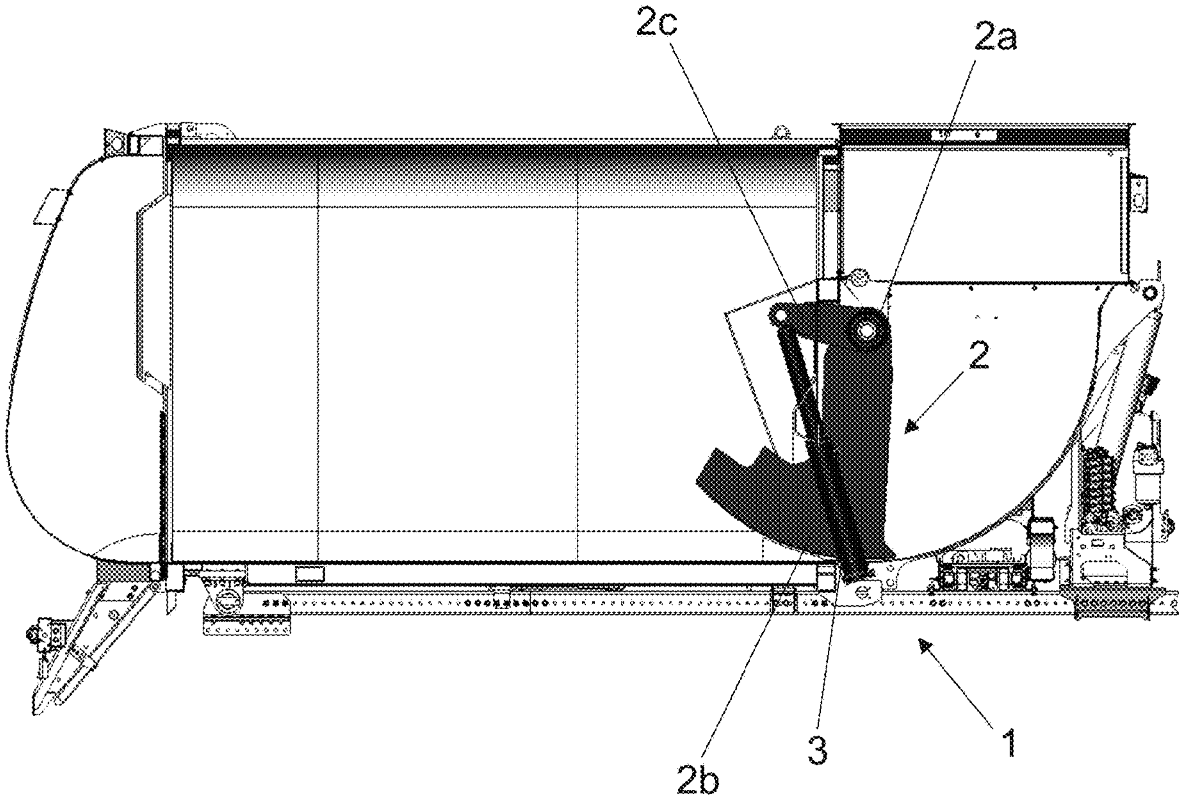

FIGS. 1 to 3 illustrate an embodiment of a compression apparatus 1 for compressing refuse into a collection bin at different stages of a compression cycle. Figures further 4 to 8 illustrate configurations of two embodiments of the invention at different stages of the compression cycle. In these embodiments, the compression cycle of the compression apparatus 1 comprises three main phases: a first extracting phase, a second extracting phase, and a retracting phase. In the first extracting phase the refuse either gives low resistance or no resistance to the compression apparatus 1. In the second extracting phase the refuse gives a high resistance to the compression apparatus 1. In the retracting phase the refuse gives no resistance to the compression apparatus 1. Therefore, the load profile changes throughout the compression cycle, and different aspects of the compression apparatus 1 are valued differently at different phases. In the first extraction phase the compression tool 2 moves from its starting position towards its end position until it meets the refuse, and the compressed refuse begins to resist the movement of the compression tool 2. When the resistance raises above a predetermined threshold, the compression apparatus 1 moves to the second extracting phase. In this second extracting phase the compression apparatus 1 exerts more force on the refuse thus completing the compression. Once all refuse is compressed into the bin and the compression tool 2 has reached its end position, the compression apparatus 1 moves to its final retraction phase wherein the compression tool 2 is retracted to its starting position. The load profiles of these 3 phases vary such that the first extracting phase requires least force production from the hydraulic cylinder 3 and the second extracting phase requires most force production from the hydraulic cylinder 3.

In the embodiment of FIGS. 1 to 3, the compression apparatus 1 comprises a compression tool 2 having a first end 2*a* and a second end 2*b*, wherein the first end 2*a* of the compression tool 2 is pivotably hinged in the compression apparatus 1, and rotation of the second end 2*b* of the compression tool 2 is actuated by a hydraulic cylinder 3. The compression apparatus 1 may comprise more than one parallel hydraulic cylinder 3 for actuating the compression tool 2, for instance two hydraulic cylinders, such that the hydraulic cylinders are positioned on each side of the compression tool 2.

In the embodiment of FIGS. 1 to 3, the compression tool 2 comprises a pivoting lever 2*c*, which extends from the first end 2*a* of the compression tool 2 and in a direction substantially perpendicular to the second end 2*b* of the compression tool 2. This configuration allows the compression tool 2 to compress the refuse into the refuse collection bin when the hydraulic cylinder 3 is extracting, and respectively to retract when the hydraulic cylinder 3 retracts. A pivoting lever 2*c* shorter than the distance between the first end 2*a* and the second end 2*b* of the compression tool 2 also allows the second end 2*b* of the compression tool 2 to travel a longer distance than the hydraulic cylinder 3, thus speeding up the compression cycle. However, other pivoting configurations with differing levers and contact points may also be utilized in connecting the hydraulic cylinder 3 to the compression tool 2.

In the embodiment of FIGS. 1 to 3, as illustrated in FIGS. 4 to 7, the hydraulic cylinder 3 comprises three separate chambers 31,32,33, such that a first extracting chamber 31 and a second extracting chamber 32 are arranged on extracting side of the hydraulic cylinder 3, and a retracting chamber 33 is arranged on retracting side of the hydraulic cylinder 3. These extracting and retracting sides are separated by a piston which is moved by supplying said hydraulic chambers with pressurized hydraulic fluid. The first extracting chamber 31 and the second extracting chamber 32 are configured to be utilized separately or jointly. Preferably, the first extracting chamber 31 and the second extracting chamber 32 are configured to be utilized separately or jointly depending on load on the compression tool 2. This allows the working area of the hydraulic cylinder 3 on the extracting side to be fully or only partially utilized during the compression cycle, thus better matching the load profile of refuse compression cycle. In this way the use of force and hydraulic fluid is optimized, and maximum output of the hydraulic cylinder 2 is only used when it is needed. This has the benefit of better efficiency and cost savings.

In the embodiment of FIGS. 1 to 3, as illustrated in FIGS. 4 to 7, the first extracting chamber 31 has a working area, which is smaller than a working area of the second extracting chamber 32. This difference in working area allows the chambers to produce different forces and to move the piston at different speeds without altering output of the pump 5. In the embodiment illustrated in FIGS. 4 to 7, the second extracting chamber 32 cannot be pressurized separately due to the valve configuration. However, with a different valve configuration also the second extracting chamber 32 could be pressurized separately, thus creating 3 different force and speed profiles on the extracting side with same pump conditions.

In the embodiment of FIGS. 1 to 3, as illustrated in FIGS. 4 to 7, the retracting chamber 33 has a working area, which is greater than the working area of the first extracting chamber 31, and smaller than the working area of the first extracting chamber 31 and the working area of the second extracting chamber 32 combined. This is preferable due to as the compression tool 2 retracts, there is no load caused by compressing refuse making the forces required to retract the compressing tool 2 to be lower. Consequently, the working area of the retracting chamber 33 may be dimensioned smaller. Further, the retracting chamber 33 has a working area, which is greater than the working area of the first extracting chamber 31, and smaller than the working area of the second extracting chamber 32. This configuration further lowers the working area of the retracting chamber 33, which results in needing a smaller volume of the hydraulic fluid to be supplied for the piston of the hydraulic cylinder 3 to travel the same distance, thus speeding up the retracting phase of the compression cycle.

In the embodiment of FIGS. 1 to 3 as illustrated in FIGS. 4 to 7, the compression apparatus 1 further comprises a first pressure sensor 6*a* for determining the load on the compression tool 2. This first pressure sensor 6*a* allows the compression apparatus 1 to detect when the compression tool 2 meets the refuse to be compressed and to monitor pressure as the load begins to increase on the compression tool 2.

Figure 4:
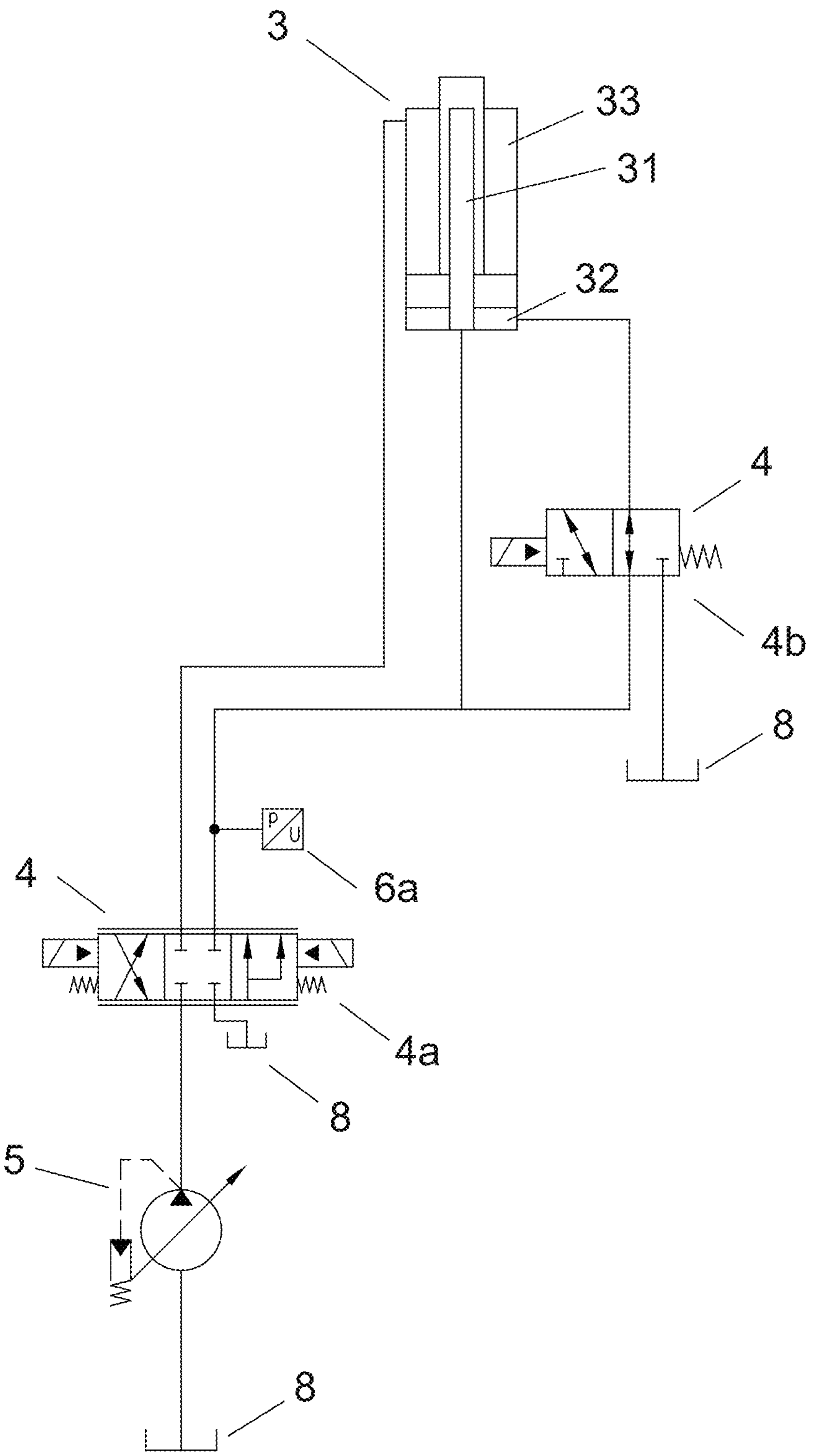
FIGS. 4 to 7 illustrate an embodiment of a hydraulic schematic of an embodiment of the compression apparatus during different stages of its operation, wherein pressurized hydraulic fluid is highlighted.

FIG. 4 illustrates the hydraulic scheme of the first embodiment at rest, wherein the position of the compression apparatus 1 is locked, and all the chambers of the hydraulic cylinder 3 are closed. The first valve 4*a* is in a such position that it does not allow the hydraulic fluid to move. This allows that the position of the compression apparatus 1 can be set and locked, which is important for worker safety.

Figure 5:
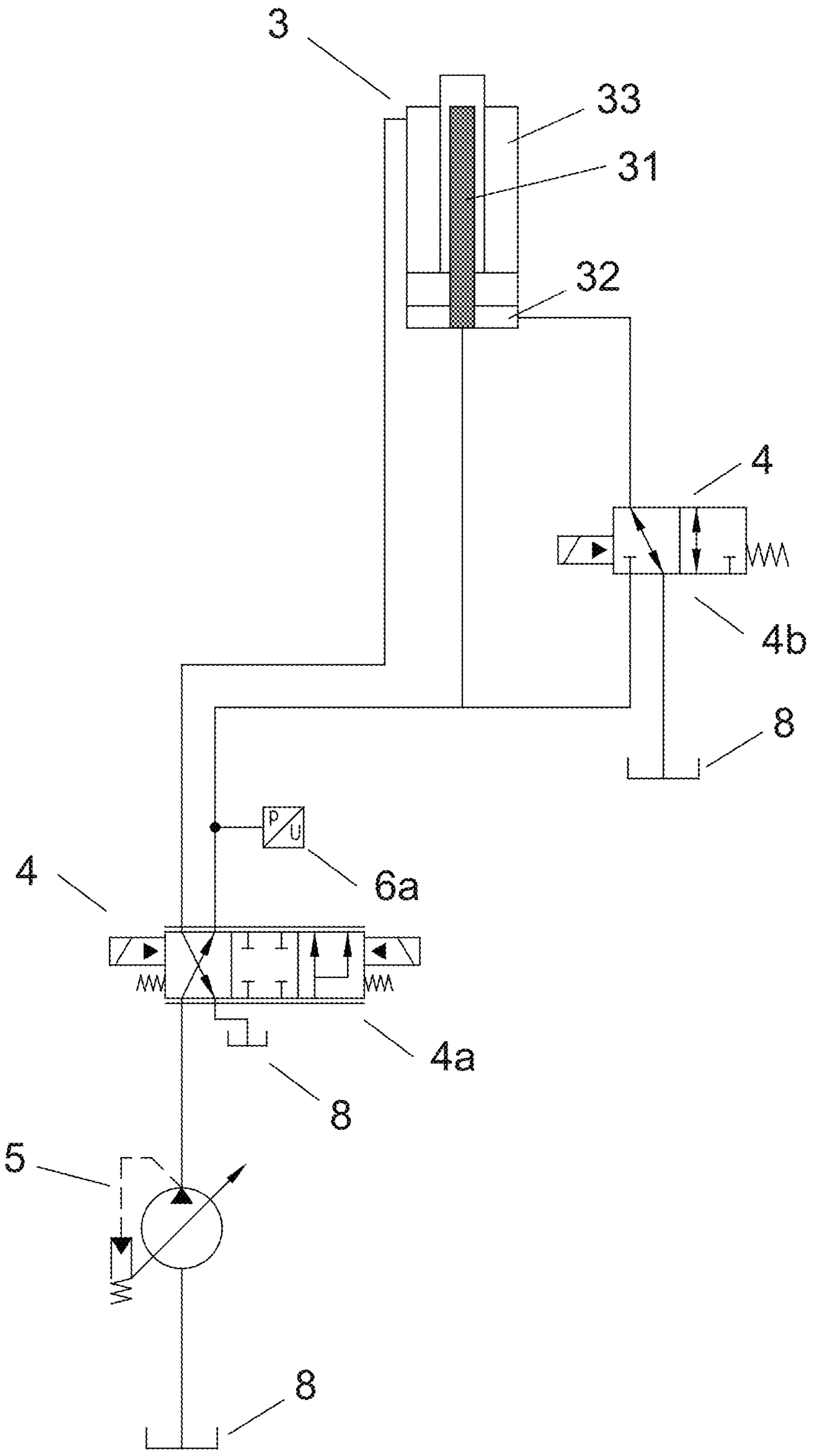

FIG. 5 illustrates the hydraulic scheme of the first embodiment in first extracting phase of the compression cycle, wherein the compression tool 2 is under a load that is below a predetermined threshold load. In the first extracting phase the first valve 4*a* is in such a position that the first valve 4*a* allows the pump 5 to pressurize only the extraction side of the hydraulic cylinder 3, such that the second valve 4*b* blocks the pump 5 from pressurizing the second extracting chamber 32, and thus only the first extracting chamber 31 is pressurized. The second valve 4*b* connects the second extracting chamber 32 with the hydraulic fluid tank 8, such that hydraulic fluid may flow into the second extracting chamber 32 as the first extracting chamber 31 extracts the piston of the hydraulic cylinder 3. Respectively, the first valve 4*a* connects the retraction chamber to the hydraulic fluid tank 8 such that the hydraulic fluid pushed out of the retracting chamber 33 is returned to the hydraulic fluid tank 8. In other words, the compression apparatus 1 comprises one or more valves 4, and the compression apparatus 1 is configured to control the valves 4 to supply only the first extracting chamber 31 with hydraulic fluid by a pump 5.

This allows the hydraulic cylinder 3 to utilize only the first extracting chamber 31, which in turn allows the first extraction phase of the compression cycle to be completed faster and with a lower hydraulic fluid volume.

Figure 6:
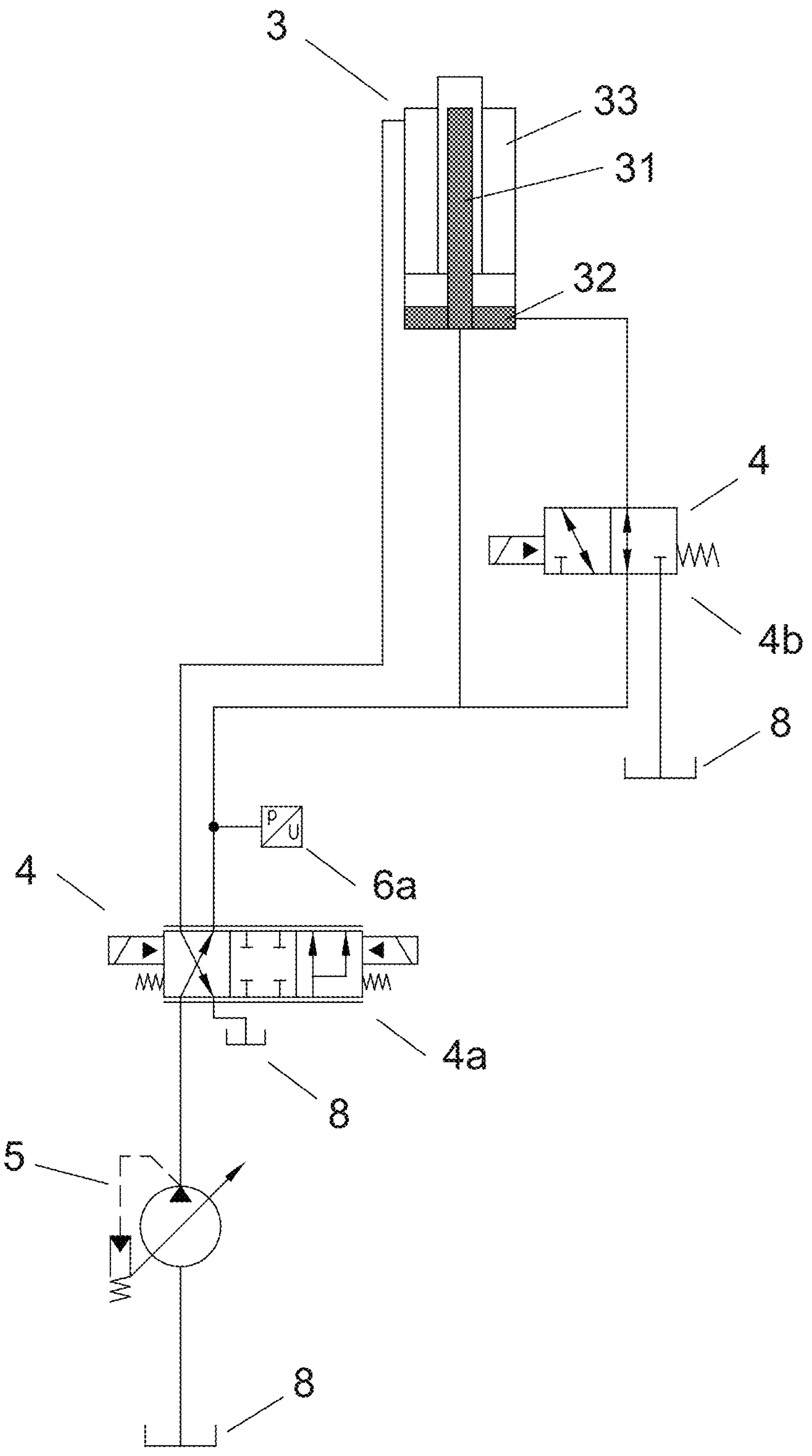

FIG. 6 illustrates the hydraulic scheme of the first embodiment in second extracting phase of the compression cycle, wherein the compression tool 2 is under a load above a predetermined threshold load. In the second extracting phase the first valve 4*a* is in such a position that the first valve 4*a* allows the pump 5 to pressurize only the extraction side of the hydraulic cylinder 3, such that the second valve 4*b* allows the pump 5 to pressurize both the first extracting chamber 31 and the second extraction chamber. Respectively, the first valve 4*a* connects the retraction chamber to the hydraulic fluid tank 8 such that the hydraulic fluid pushed out of the retracting chamber 33 is returned to the hydraulic fluid tank 8, In other words, when the load is above a predetermined threshold, the compression apparatus 1 is configured to control the valves 4 to supply both the first extracting chamber 31 and the second extracting chamber 32 with hydraulic fluid by the pump 5, This allows the hydraulic cylinder 3 to utilize both first extracting chamber 31 and second extracting chamber 32 to produce maximum force and to complete the second extracting phase of the compression cycle. This is advantageous as this sequence which requires more hydraulic fluid is only utilized when it is needed.

Figure 7:
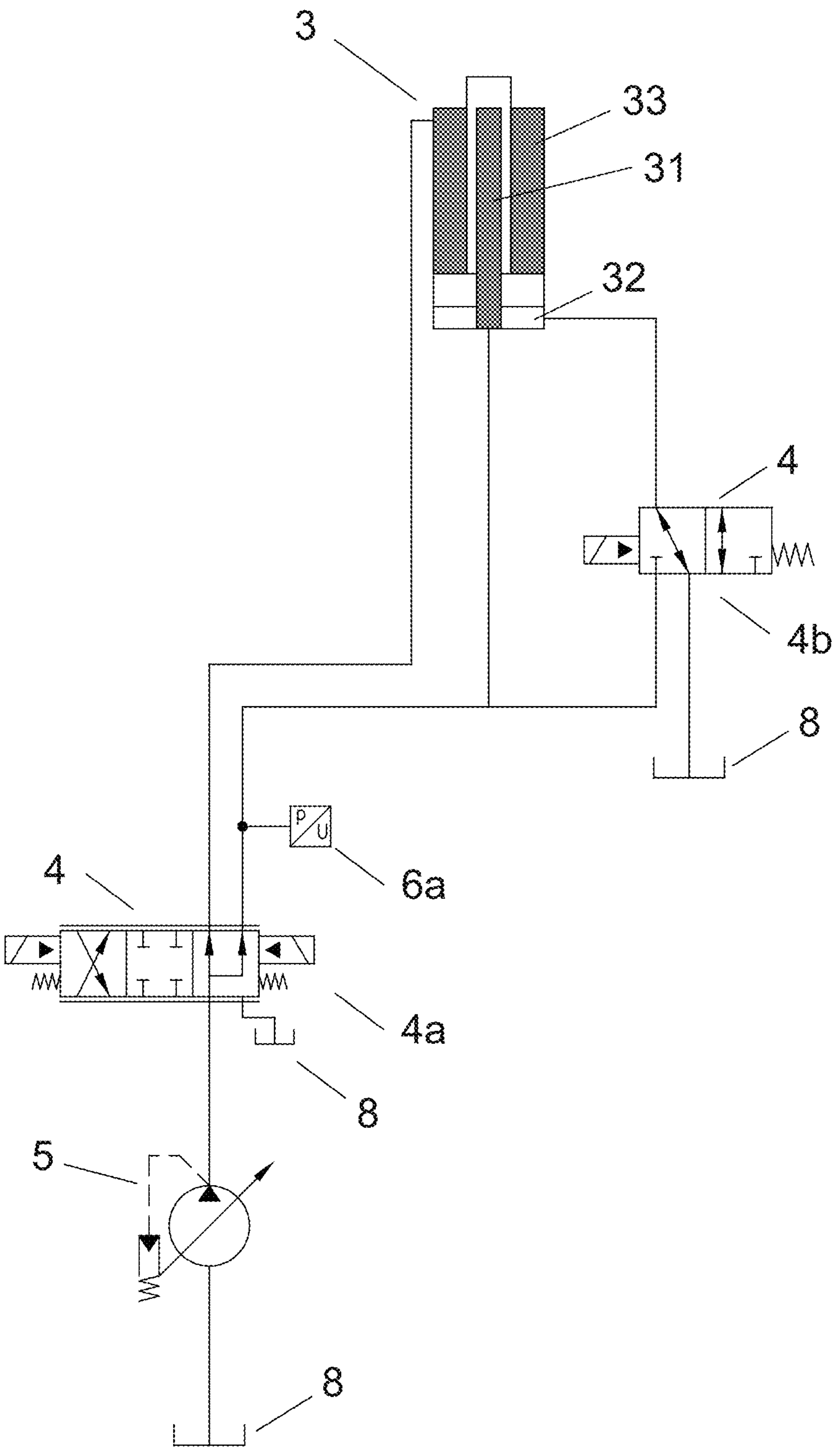

FIG. 7 illustrates the hydraulic scheme of the first embodiment in retracting phase of the compression cycle. In the retracting phase the first valve 4*a* is in such a position that the first valve 4*a* allows the pump 5 to pressurize both the extraction side and the retraction side of the hydraulic cylinder 3, such that second extracting chamber 32 is shut off by the second valve 4*b*. The first valve 4*a* also allows the hydraulic fluid to be circulated between the extraction side and the retraction side of the hydraulic cylinder 3, As the working area of the retraction chamber is greater than the working area of the first extracting chamber 31, the hydraulic fluid is pushed out of the first extracting chamber 31 and circulated into the retracting chamber 33. In other words, the compression apparatus 1 is configured to control the valves 4 to supply both the retracting chamber 33 and the first extracting chamber 31 with hydraulic fluid by the pump 5. This allows a retracting area to be combined with an extracting area in order to produce a small net retracting cylinder area, which requires a very small flow to operate, thus resulting in savings. However, the retracting phase can also be done without the recirculation such that the hydraulic fluid pushed out of the first extracting chamber 31 is returned to the hydraulic fluid tank 8. In that case, the compression apparatus 1 is configured to control the valves 4 to supply only the retracting chamber 33 with hydraulic fluid by the pump 5.

In the embodiment of FIGS. 4 to 7, the first valve 4*a* is a directional valve having 3 positions and 4 ports, and the second valve 4*b* is a directional valve having 2 positions and 3 ports. Further the first valve 4*a* is spring centered having return springs on both sides of the valve, particularly the first valve 4*a* is a closed center valve, and thus the hydraulic cylinder 3 can be stopped mid-stroke. This is advantageous for refuse compression, as it is an important safety measure to be able to stop the movement mid-stroke. Further, both valves 4 in this embodiment are electrical solenoid controlled directional valves, wherein the solenoid control can be used to offset the default position set by the springs. However, also other suitable valve configurations may be used to achieve the same functionality of the invention.

Figure 8:
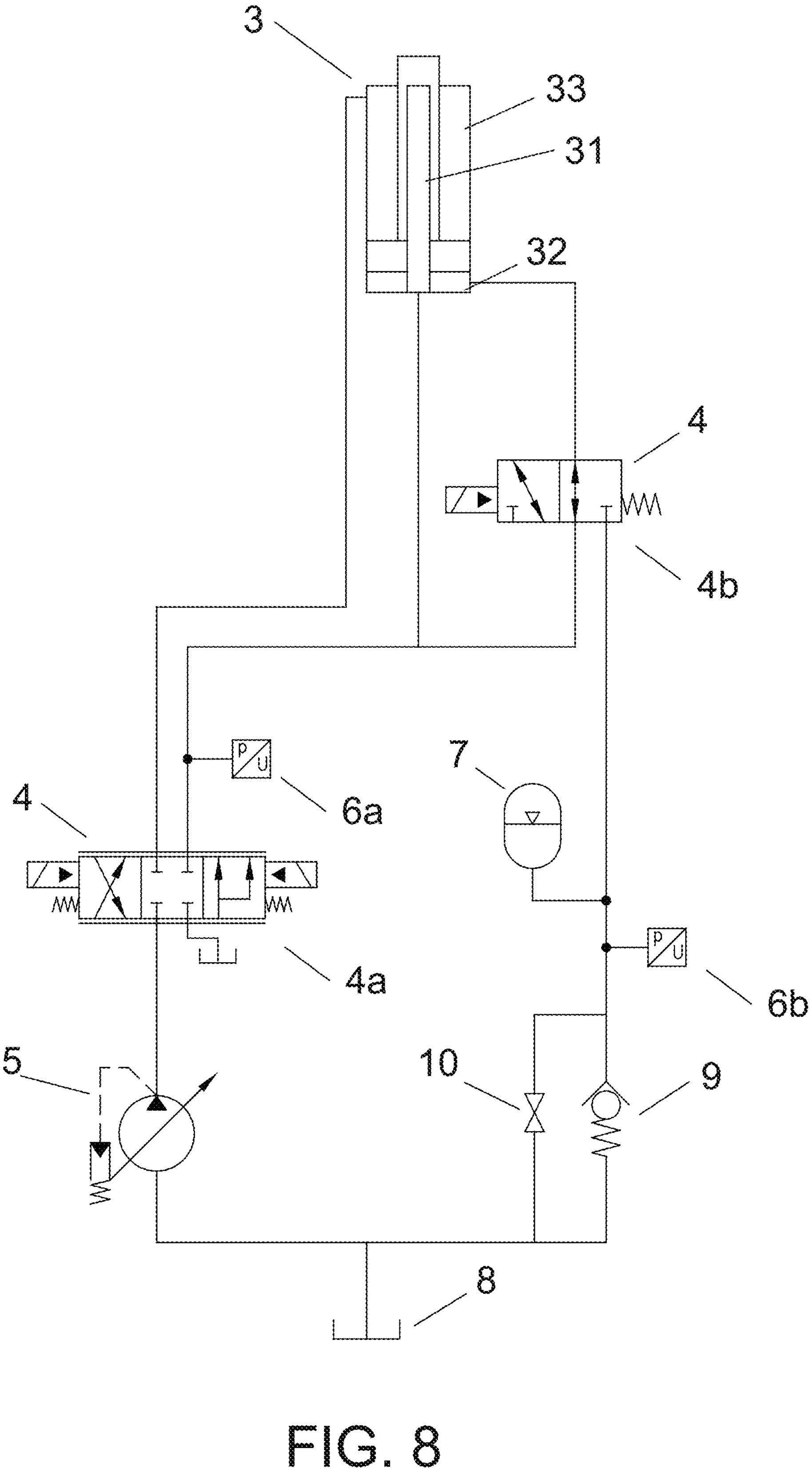
FIG. 8 illustrates a second embodiment of a hydraulic schematic of an embodiment of the compression apparatus.

In the second embodiment illustrated in FIG. 8, the compression apparatus 1 further comprises a hydraulic accumulator, which in this embodiment is formed as a closed hydraulic fluid tank 7 connected to the second extracting chamber 32 through the second valve 4*b*. When the second valve 4*b* is in a second position and the hydraulic cylinder 3 is retracted, the hydraulic fluid from the second extracting chamber 32 is pushed to the closed tank 7 creating pressure in the closed tank 7. This pressure is stored by moving the second valve 4*b* to its first position and the pressure can be released by moving the second valve 4*b* to its second position. This is especially advantageous in the first extraction phase, when only the first extracting chamber 31 is pressurized with the pump 5. This stored pressure allows the hydraulic fluid to easily flow into the second extracting chamber 32, so it does not restrict the use of the hydraulic cylinder 3. Further, this stored pressure in the closed tank 7 is used to prevent the second extracting chamber from cavitating. However, also other common configurations for hydraulic accumulators may be used.

Further, the second embodiment illustrated in FIG. 8 comprises a second pressure sensor 6*b* and a relief valve 9 for releasing the pressure. This relief valve 9 allows the compression apparatus 1 to release the pressure into the hydraulic fluid tank 8, if the pressure increases over a set threshold pressure. This allows the hydraulic circuit to be protected from too high pressure. Additionally, the compression apparatus 1 further comprises a shut-off valve 10, which is closed during normal use of the compression apparatus 1 but may be opened to release pressure or to empty the closed tank 7. This is beneficial for activities that require the circuit to be free of pressure, such as when performing maintenance tasks on the compression apparatus 1.

Figure 9:
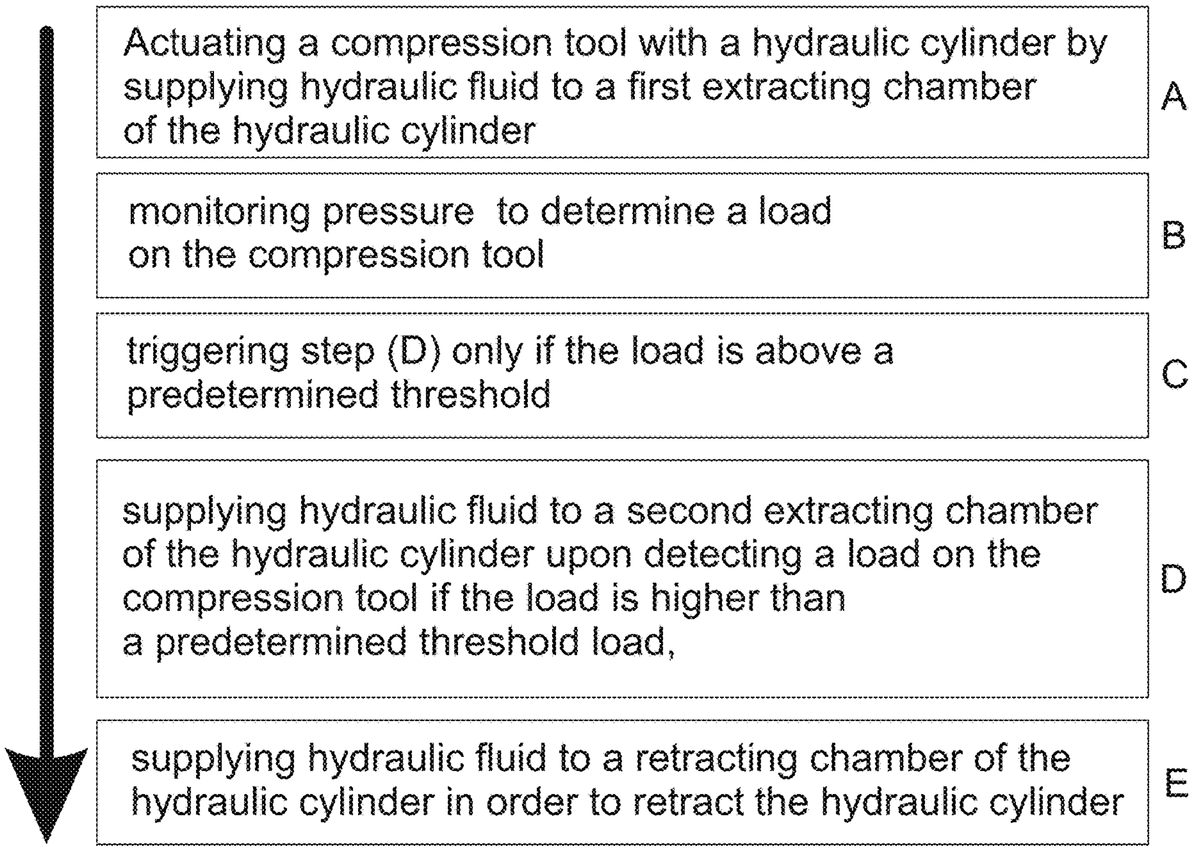
FIG. 9 illustrates a flowchart of a method according to the invention.

FIG. 9 illustrates a flow chart of an embodiment of a method for operating a compression apparatus, the method comprising: A actuating a compression tool with a hydraulic cylinder by supplying hydraulic fluid to a first extracting chamber of the hydraulic cylinder, B monitoring pressure to determine a load on the compression tool, C triggering step D only if the load is above a predetermined threshold, D supplying hydraulic fluid to a second extracting chamber of the hydraulic cylinder upon detecting a load on the compression tool if the load is higher than a predetermined threshold load, and E supplying hydraulic fluid to a retracting chamber of the hydraulic cylinder in order to retract the hydraulic cylinder.

Further, in the method step (E) the hydraulic fluid may be supplied both to the retracting chamber and the first extracting chamber of the hydraulic cylinder in order to retract the hydraulic cylinder. By supplying both the retracting chamber and the first extracting chamber with hydraulic fluid, a small net retracting area is used for retracting the hydraulic cylinder, requiring a very small flow to operate.

Preferably, the compression apparatus 1 is arranged in a refuse collection vehicle for compressing refuse collected from refuse containers on a refuse collection route.

Preferably, the pump 5 is a fixed displacement pump or a variable pump.

Preferably, the compression apparatus 1 comprises a controller, which may be implemented by circuits, or combination of circuits and software, such as a processor running a software stored in a memory.

It is to be understood that the above description and the accompanying figures are only intended to illustrate the present invention. It will be obvious to a person skilled in the art that the invention can be varied and modified without departing from the scope of the invention.

The invention claimed is:

1. A compression apparatus configured to compress refuse into a collection bin, the compression apparatus comprising:

a compression tool having a first end and a second end, wherein the first end of the compression tool is pivotably hinged in the compression apparatus, and rotation of the second end of the compression tool is actuated by a hydraulic cylinder, wherein the hydraulic cylinder comprises three separate chambers, such that a first extracting chamber and a second extracting chamber are arranged on an extracting side of the hydraulic cylinder, and a retracting chamber is arranged on a retracting side of the hydraulic cylinder, wherein the first extracting chamber has a working area which is smaller than a working area of the second extracting chamber, wherein the retracting chamber has a working area, which is greater than the working area of the first extracting chamber, and smaller than the working area of the first extracting chamber and the working area of the second extracting chamber combined, wherein the first extracting chamber and the second extracting chamber are configured to be utilized separately or jointly, and wherein the compression apparatus is configured in a retracting phase to control a valve to a position where hydraulic fluid from a pump is supplied both to the retracting chamber and the first extracting chamber such that the valve allows fluid to be circulated between the first extracting chamber and the retracting chamber.

2. The compression apparatus according to claim 1, wherein the retracting chamber has a working area, which is greater than the working area of the first extracting chamber, and smaller than the working area of the second extracting chamber.

3. The compression apparatus according to claim 1, wherein the compression apparatus further comprises another valve, and the compression apparatus is configured to control the valves to supply only the first extracting chamber with hydraulic fluid by the pump.

4. The compression apparatus according to claim 3, wherein the compression apparatus is configured to control the valves to supply both the first extracting chamber and the second extracting chamber with hydraulic fluid by the pump.

5. The compression apparatus according to claim 3, wherein the compression apparatus is configured to control the valves to supply only the retracting chamber with hydraulic fluid by the pump.

6. The compression apparatus according to claim 3, wherein the compression apparatus is configured to control the valves to supply both the retracting chamber and the first extracting chamber with hydraulic fluid by the pump.

7. The compression apparatus according to claim 1, further comprising a pressure sensor configured to determine a load on the compression tool.

8. The compression apparatus according to claim 7, wherein the | compression apparatus is configured to control the valve and another valve based on the load determined by the pressure sensor.

9. The compression apparatus according to claim 8, wherein the compression apparatus is configured to control the valves based on the load determined by the pressure sensor such that when the load is below a predetermined threshold, the compression apparatus is configured to control the valves to supply the first extracting chamber with hydraulic fluid by the pump, and when the load is above the predetermined threshold, the compression apparatus is configured to control the valves to supply both the first extracting chamber and the second extracting chamber with hydraulic fluid by the pump.

10. The compression apparatus according to claim 1, wherein the compression apparatus is arranged in a refuse collection vehicle.

* * * * *